United States Patent [19]

Wahlberg

[11] Patent Number: 4,571,254
[45] Date of Patent: Feb. 18, 1986

[54] METHOD FOR PRODUCING FERTILIZER FROM TREE ASH AND SOFTWOOD BARK OR FROM OTHER TREE WASTE

[76] Inventor: Arvo Wahlberg, Soukan rantatie 16C, SF-02360 Espoo 36, Finland

[21] Appl. No.: 669,607

[22] Filed: Nov. 8, 1984

[30] Foreign Application Priority Data

Mar. 28, 1984 [FI] Finland ............................ 841230

[51] Int. Cl.⁴ ............................................. C05F 11/02
[52] U.S. Cl. ................................................. 71/24; 71/23; 71/28; 71/64.02; 71/64.13; 71/903; 71/904
[58] Field of Search ................ 71/23, 24, 64.02, 25, 71/28, 64.13, 901, 903, 904

[56] References Cited

U.S. PATENT DOCUMENTS

| | | | |
|---|---|---|---|
| 2,881,066 | 4/1959 | Sproull et al. | 71/23 |
| 4,067,716 | 1/1978 | Sterrett | 71/24 |

FOREIGN PATENT DOCUMENTS

| | | | |
|---|---|---|---|
| 1110864 | 10/1981 | Canada | 71/23 |
| 0004632 | 10/1979 | European Pat. Off. | 71/23 |

*Primary Examiner*—Ferris H. Lander
*Attorney, Agent, or Firm*—Karl F. Ross; Herbert Dubno

[57] ABSTRACT

The present invention relates to a method for producing fertilizer from softwood bark and/or tree waste in which the softwood bark is decomposed at a temperature of 70° . . . 140° C., when the protective substances detrimental to plants can be eliminated. Bark or tree ash is added to the ground bark mass in high pressure along with urea and, if necessary, with phosphorus and the product is finally granulated. Peat is added to the bark mass at the first stage of the process in order to increase granulation capacity and nutrient storage capacity. The decomposition temperature depends on the age of the mass. All urea is added in the end of the process in order to avoid the danger of toxicity.

12 Claims, 1 Drawing Figure

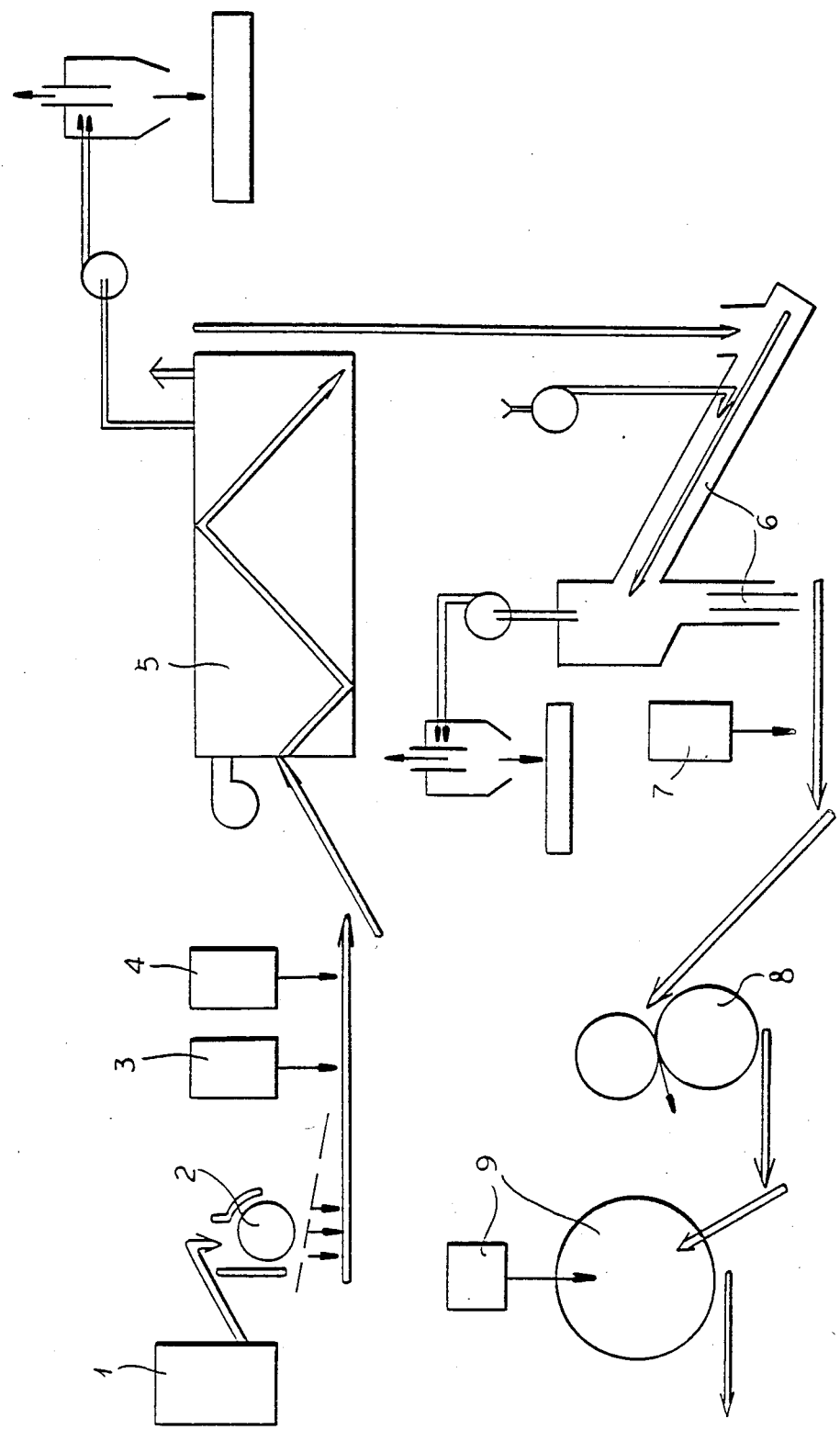

METHOD FOR PRODUCING FERTILIZER FROM TREE ASH AND SOFTWOOD BARK OR FROM OTHER TREE WASTE

The present invention relates to a method for producing fertilizer from tree ash and softwood bark or from other tree waste.

Bark or tree waste and ash have been used in producing fertilizers, as their fertilizing nature has been known for a long time. Both have been used separately as raw material, and the production methods have been difficult.

The present invention relates to a more modern method in which ground softwood bark or tree waste, in which urea and tree or bark ash has been added, is decomposed in high temperature and pressure so that the protective substances, which are detrimental to plants, can be eliminated and the mass composition converted without loss of micronutrients. Finally, the product is granulated and the grains are coated with urea solution and ash.

The method has worked satisfactorily. However, the nutrient storage capacity, and the stability of the composition have been unsatisfactory. Most of the urea is added at a temperature over 110° C., which requires great care in order to avoid the formation of dangerous toxins. Moreover, a rigid application of the process may also create problems.

The present invention eliminates these disadvantages. The characteristics of the invention are presented in the patent claim.

The following example and the accompanying drawing illustrate the process reported in the invention.

At the first stage, softwood bark or softwood waste from a container 1 is ground in a grinding mill 2 and sieved in a vibrating screen; peat is added from a container 3 (and phosphorus $P_2O_5$ if the share of phosphorus is less than 1 percent of the solid matter); and, if desired, ash from a container 4. Peat and ash (and phosphorus) can also be added as a mixture. Further, it is possible to use a premixed composition of bark, peat and, if desired, of ash (and, if necessary, of phosphorus). Then the mixture is heated to 70° ... 140° C. in a pressure chamber furnace 5, with a pressure of 1 ... 1.6 at. If the mass is old, a temperature of 70° ... 110° C. will suffice, but fresh bark and tree fibres require a temperature of 110° ... 140° C.

At the second stage, after cooling and devaporisation 6, when the temperature of the mass is approximately 90° C. or less, a rationed 20 ... 30 kg/m³ amount of 46 percent urea solution is added from a tank 7; the product is granulated by spring loaded rolls 8; and, finally, the grains are coated with pure ash by pressure injection in an agitator 9. During the hot process, for instance detrimental lipophilic compounds like pitch, which includes terpenoids like resin acids and mono- and sesquiterpenes, are eliminated from the bark. The particle size of the product varies from 0.2 to 8 millimeters and the size of the grains from 7 to 10 millimeters. Nitrogen is unable to escape, because it is bound by peat, ash and carbohydrates, and the nutrient composition of the product is close to optimum for plants for the part of nitrogen, phosphorus, potassium and trace nutrients. The nutrients are accumulated in the internal solution of peat to such an extent that the stability of the composition is very high. Furthermore, the product is not harmfull to soil, as the invention relates to recycling natural products and it even increases the activity and productivity of poor soil.

The hemicellulose in peat fibres increases the granulation capacity and the impact strength of the grains. Moreover, since urea is not added at a high temperature of 110° ... 140° C., which is alarmingly close to the temperature level where the formation of dangerous toxins starts, but approximately at 90° C., minor negligence does not cause any danger of toxicity.

What I claim is:

1. A process for the preparation of a fertilizer composition containing old softwood bark or tree waste which comprises the following steps:
   (a) grinding the old softwood bark or tree waste;
   (b) adding peat to the ground old softwood bark or tree waste to form a mixture;
   (c) heating the mixture formed in step (a) to a temperature of 70° to 140° C. at a pressure of 1 to 1.6 atmospheres to decompose the mixture;
   (d) cooling and devaporizing the mixture decomposed during step (c) thereby adjusting the temperature to 90° C. or less;
   (e) treating the mixture with 20 to 30 kg/m³ of a 46% urea solution;
   (f) granulating the urea-treated mixture; and
   (g) coating the grains obtained in step (f) with ash.

2. The process defined in claim 1, wherein in step (b), peat and ash are added to the old ground softwood bark or tree waste to be heated in premixed form.

3. The process defined in claim 1, wherein prior to step (c), the old softwood bark or tree waste and peat are brought to the process in premixed form.

4. The process defined in claim 1, wherein prior to step (c), the old softwood bark or tree waste, the peat and ash are brought to the process in premixed form.

5. The process defined in claim 1, wherein prior to step (b) the old softwood bark or tree waste and ash are brought to the process in premixed form.

6. The process defined in claim 1 wherein following step (b), phosphorus pentoxide is added to the mixture if the mixture contains less than 1% phosphorus.

7. A process for the preparation of a fertilizer composition containing fresh softwood bark or tree waste which comprises the following steps:
   (a) grinding the fresh softwood bark or tree waste;
   (b) adding peat to the ground fresh softwood bark or tree waste to form a mixture;
   (c) heating the mixture formed in step (a) to a temperature of 110° to 140° C. at a pressure of 1 to 1.6 atmospheres to decompose the mixture;
   (d) cooling and devaporizing the mixture decomposed during step (c) thereby adjusting the temperature to 90° C. or less;
   (e) treating the mixture with 20 to 30 kg/m³ of 46% urea solution;
   (f) granulating the urea-treated mixture; and
   (g) coating the grains obtained in step (f) with ash.

8. The process defined in claim 7, wherein in step (b) peat and ash are added to the fresh ground softwood bark or tree waste to be heated in premixed form.

9. The process defined in claim 7, wherein prior to step (c), the fresh softwood bark or tree waste and peat are brought to the process in premixed form.

10. The process defined in claim 7, wherein prior to step (c), the fresh softwood bark or tree waste, the peat and ash are brought to the process in premixed form.

11. The process defined in claim 7, wherein prior to step (b), the fresh softwood bark or tree waste and ash are brought to the process in premixed form.

12. The process defined in claim 7 wherein following step (b), phosphorus pentoxide is added to the mixture if the mixture contains less than 1% phosphorus.

* * * * *